(12) United States Patent
Candelore

(10) Patent No.: US 11,778,261 B2
(45) Date of Patent: Oct. 3, 2023

(54) ELECTRONIC CONTENT GLOSSARY

(71) Applicant: Sony Group Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/474,864

(22) Filed: Sep. 14, 2021

(65) Prior Publication Data

US 2023/0084372 A1 Mar. 16, 2023

(51) Int. Cl.
*H04N 21/422* (2011.01)
*H04N 21/482* (2011.01)
*H04N 21/84* (2011.01)

(52) U.S. Cl.
CPC . *H04N 21/42209* (2013.01); *H04N 21/42203* (2013.01); *H04N 21/482* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 8,713,002 B1 * | 4/2014 | Sahami | H04N 21/4828 707/723 |
| 8,990,876 B2 | 3/2015 | Kim et al. | |
| 9,516,391 B2 | 12/2016 | Ferren et al. | |
| 2005/0188412 A1 * | 8/2005 | Dacosta | H04N 21/4722 348/E7.071 |
| 2013/0239163 A1 | 9/2013 | Kim et al. | |
| 2013/0321570 A1 | 12/2013 | Ferren et al. | |
| 2014/0101699 A1 * | 4/2014 | Park | H04N 21/4314 725/40 |
| 2014/0136509 A1 * | 5/2014 | Kritt | G06F 16/951 707/723 |
| 2014/0188926 A1 * | 7/2014 | Chandel | G06F 16/435 707/767 |
| 2015/0248428 A1 * | 9/2015 | Smiling | G06F 16/951 707/706 |
| 2015/0370893 A1 * | 12/2015 | Checkley | G06F 16/7867 707/721 |
| 2015/0382047 A1 * | 12/2015 | Van Os | H04N 21/42203 725/38 |
| 2018/0032513 A1 * | 2/2018 | Venkataraman | H04N 21/42204 |
| 2018/0285889 A1 * | 10/2018 | Dunmire | H04L 51/04 |
| 2019/0014384 A1 * | 1/2019 | Oh | H04N 21/25891 |
| 2019/0121855 A1 * | 4/2019 | Alexander | G06F 16/248 |
| 2019/0149584 A1 * | 5/2019 | DiBello | H04N 21/25891 709/204 |
| 2019/0179846 A1 * | 6/2019 | Taboriskiy | H04N 21/4722 |
| 2020/0045364 A1 | 2/2020 | Tulis et al. | |
| 2020/0413149 A1 * | 12/2020 | Bryant | G06F 16/78 |

* cited by examiner

*Primary Examiner* — Alexander Q Huerta
(74) *Attorney, Agent, or Firm* — John L. Rogitz

(57) ABSTRACT

A glossary may be seamless accessed using a content player to provide relevant information about an audio video series or show or movie by using search queries or scrolling an electronic list of terms to help cognitively challenged people.

9 Claims, 6 Drawing Sheets

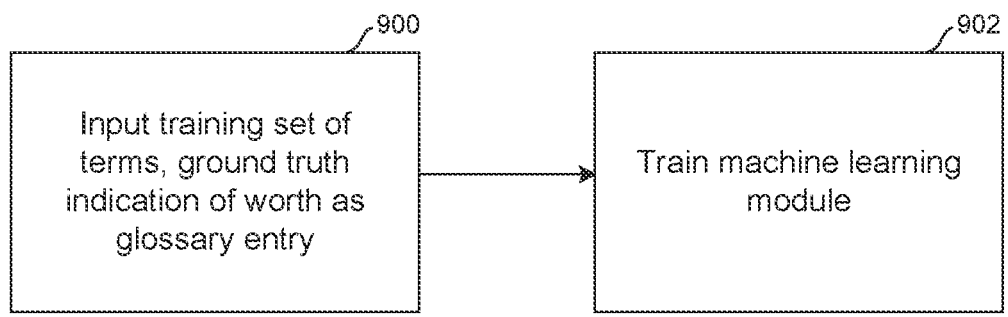
FIG. 9   Training

ELECTRONIC CONTENT GLOSSARY

FIELD

The present application relates to technically inventive, non-routine electronic glossary solutions that are necessarily rooted in computer technology and that produce concrete technical improvements.

BACKGROUND

In lengthy audio video content such as movies, TV series, etc. there may be many different characters, imaginary alien races, fantasy technology, magical powers, kingdoms, and terms as well as intricate plots and subplots that are difficult to remember especially over many seasons. Indeed, many movies and shows create their entire own world of terminology, make-believe locations, chronology of events, and relationship between characters. The cognitively challenged have a hard time remembering these details. Much character development, background and history may be lost if a viewer is casually browsing the content (going in and out of various episodes).

Simply searching for terms, e.g., on a smart phone requires the user to conjure effective search terms that may or may not lead to relevant information. It is a "hit or miss" process, and not a consistent way to get information. And the person might have to try various links. Furthermore, the links may be to websites created by fans and consequently the information may not always be present, correct, or complete.

SUMMARY

Present principles provide an accessible technique to get information about a show that is seamlessly integrated into the player application. While a user is consuming content an electronic glossary may be conveniently accessed to provide relevant information about an audio video series or show or movie by using search queries or scrolling list of terms to help cognitively challenged people.

This glossary, specific for the content being consumed, can be invoked through various means—a RC key press, voice command, or on-screen navigation.

Using the RC, the glossary can be invoked by pressing once, pressing multiple times, or pressing for a long period of time a button on the remote control. For instance, if the RC has a discrete button labelled "Glossary", then that could be pressed. However, most RCs would not have that, and the glossary can be invoked by pressing on a button multiple times or pressing on a button for a long time. It should be understood that a single pressing, multiple pressing, or long pressing a button can each initiate a different operation by the player application. And so, for example, if the RC as a MUTE, DISPLAY or INFO button then pressing one of those couple of times in quick succession or a long time could bring up an alternate function. The alternate function would be the glossary feature.

Using voice input, the glossary can be invoked by pressing a microphone button on the RC or by selecting a microphone icon on-screen, and then speaking the word "glossary". In content playback mode, it is possible that the player application can use voice input to automatically launch the glossary feature so that "glossary" would not need to be spoken. Rather a search term or phrase could be spoken. When using voice input, the player application could briefly pause the playback of content while the glossary search term or phrase is spoken.

Using on-screen navigation, the glossary can be invoked by direct selection from a list of icons shown in the display. The glossary would typically be shown as a feature of the player application while the player is playing content or highlighting content choices.

When the glossary is invoked, there are multiple possibilities for what happens. One possibility is that an alphabetized list of terms related to the particular movie, TV series or show being consumed is immediate shown on-screen. The glossary may then be browsed using down/up arrows or page down/up and select keys on the remote control (RC). Another possibility is that a glossary search field is presented. The user can type in or speak search queries for the particular movie, TV series or show. Typing using entails the display of a soft keyboard on screen that the viewing needs to use to input letters and numbers one at a time using the RC. Speaking allows the input of natural language questions in addition to simple search terms. For example, when watching an episode of a program featuring a north wall, a viewer might ask "what is the North Wall?" or "what is dragon glass?". Many types of content specific questions may be asked such as "Who", "What", "Where", "When", and "How". Glossary queries can be directly invoked while content is playing onscreen in the background or foreground or while a content choice is highlighted in one of the onscreen menus. The information can be overlaid on top of the content or menu, or in a separate window.

The glossary feature of the player can access an encyclopedic database on a remote server. The remote server can use artificial intelligence to interpret the natural language questions and combines that with information sent by the player regarding the content being watched to provide the most relevant answers. The answers can also provide links to other data that may be browsed in sequence.

Accordingly, an apparatus includes at least one computer memory that is not a transitory signal and that in turn includes instructions executable by at least one processor to present audio video (AV) content on a display. The instructions are executable to receive a signal to invoke a player glossary feature, and responsive to the signal, present on the display either an alphabetical list of terms or a glossary search field.

The instructions may be executable to, responsive to selection from the alphabetical list of terms related to the AV content or input in the glossary search field, present on the display information pertaining to the selection.

The apparatus may include the processor and the processor may be implemented in the display, in a remote control (RC) configured to control the display, in a server remote from the display and communicating therewith, or combinations thereof.

If desired, the glossary can be generated by at least one machine learning (ML) model.

In another aspect, a method includes presenting on a display audio video (AV) content. The method further includes presenting on the display an alphabetical list of terms pertaining to the AV content or a glossary search field and receiving selection from the list of terms or results from input from the search field. The method includes, responsive to the selection or search input, presenting on the display information pertaining to the selection.

In another aspect, an apparatus includes at least one display and at least one processor configured to control the display and programmed with instructions to present on the display a glossary pertaining to at least one audio video (AV)

content or a glossary search field, and responsive to selection from the glossary or search query, present information on the display pertaining to the selection.

The details of the present application, both as to its structure and operation, can best be understood in reference to the accompanying drawings, in which like reference numerals refer to like parts, and in which:

BRIEF DESCRIPTION OF THE DRAWINGS

FIG. 9 illustrates example logic in example flow chart format for training the ML model.

DETAILED DESCRIPTION

Figure 1:
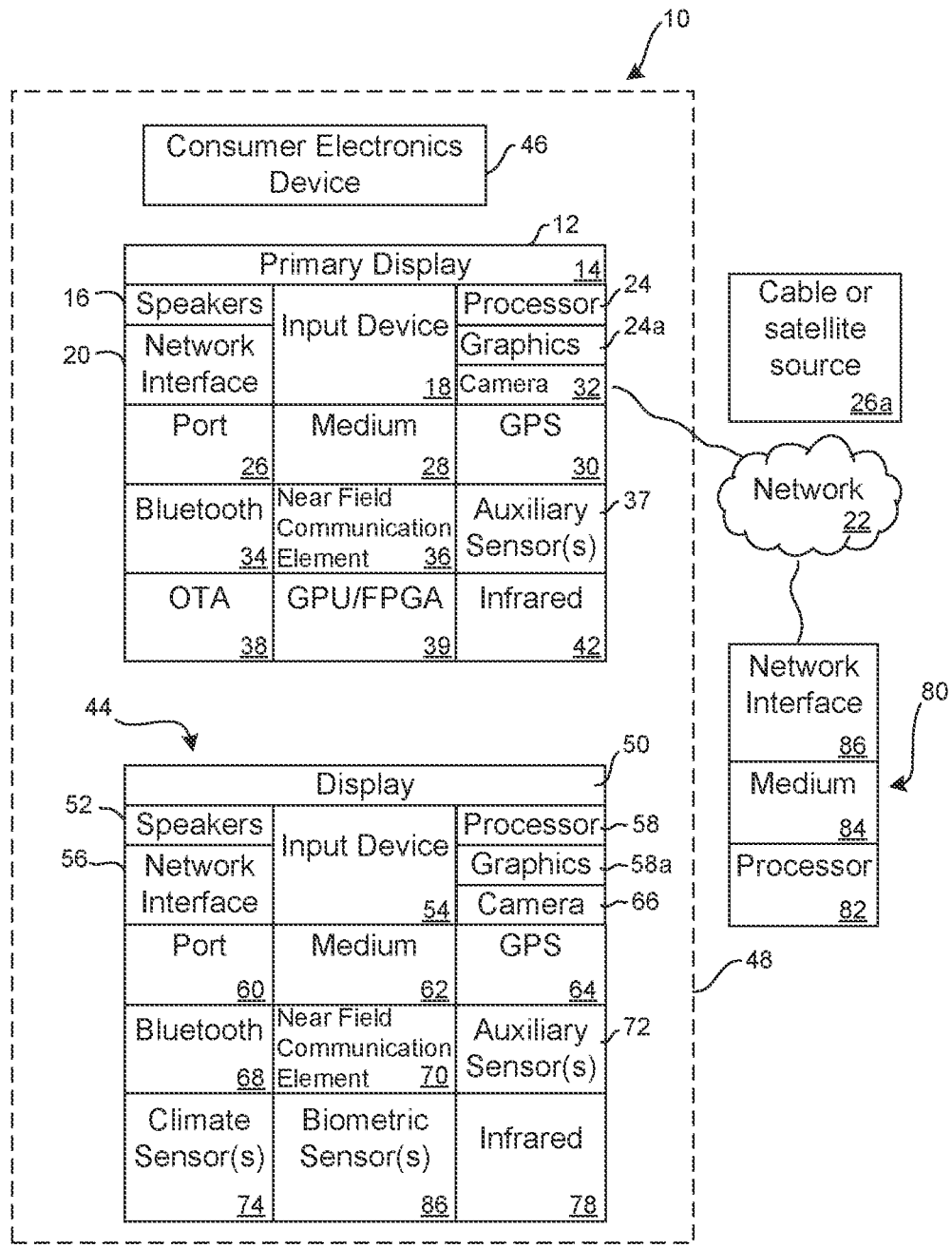
FIG. 1 is a block diagram of an example system in accordance with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g., computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVDD 12 and/or other computers described herein is configured to undertake present principles (e.g., communicate with other CE devices to undertake present principles, execute the logic described herein, and perform any other functions and/or operations described herein).

Accordingly, to undertake such principles the AVDD 12 can be established by some, or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g., an audio receiver/microphone for e.g., entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g., controlling the display 14 to present images thereon and receiving input therefrom. Furthermore, note the network interface 20 may be, e.g., a wired or wireless modem or router, or other appropriate interface such as, e.g., a wireless telephony transceiver based on 5G, or Wi-Fi transceiver as mentioned above, etc.

In addition to the foregoing, the AVDD 12 may also include one or more input ports 26 such as, e.g., a high-definition multimedia interface (HDMI) port or a USB port to physically connect (e.g., using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g., receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g., determine the location of the AVDD 12 in e.g., all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g., for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) and/or a field-programmable gate array (FPGA) 39. The GPU and/or FPGA 39 may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g., an audio receiver/microphone for e.g., entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g., controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g., using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g., determine the location of the first device 44 in e.g., all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first device 44 may include still other sensors such as e.g., one or more climate sensors 74 (e.g., barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
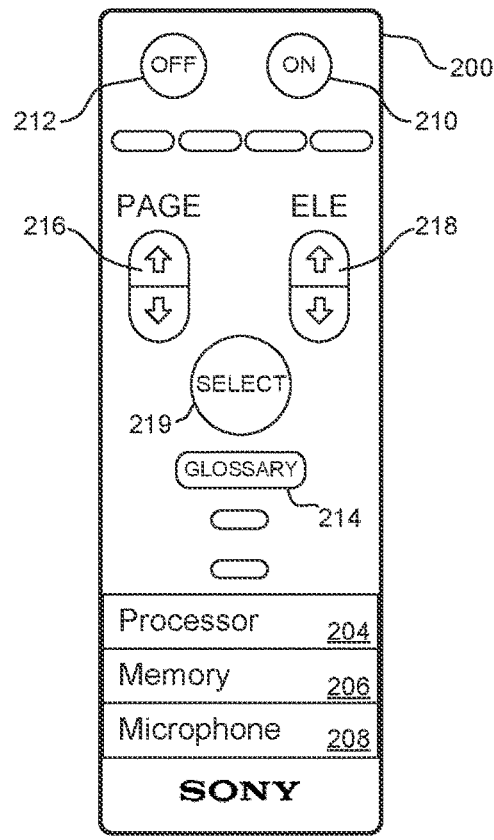
FIG. 2 is a block diagram of a remote control (RC) consistent with present principles.
Figure 2:
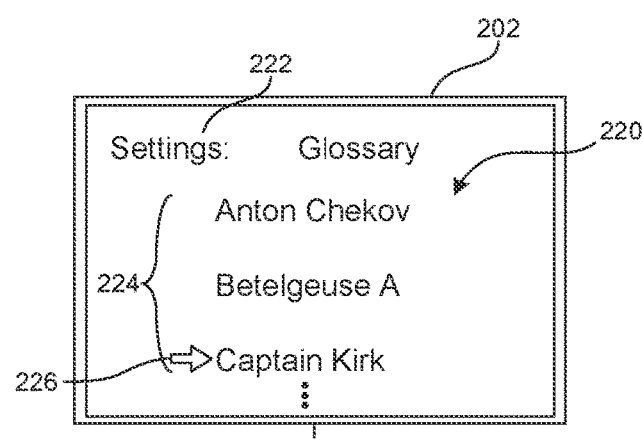

FIG. 2 illustrates a remote control (RC) 200 for wirelessly (e.g., using IR or RF) controlling a display 202 such as any of the display described herein. The RC 200 and display 202 may include any of the appropriate components of FIG. 1. Accordingly, among other components the RC 200 may include one or more processors 204 accessing one or more memories 206 and one or more microphones 208. It is to be understood that the display 202 may be implemented by the AVDD 12 shown in FIG. 1 and accordingly may also include processors, storages, and the like.

The RC 200 may include an on button 210 and an off button 212 for energizing and deenergizing the display 202. The RC 200 also may include one or more special keys such as a glossary key 214. The RC 200 may also include navigation keys such as page up/down keys 216, element up/down keys 218, and select key 219.

The display 202 may present one or more user interfaces (UI) such as a UI 220 that may be accessed from a settings menu having an entry 222 "glossary" as shown. Description below details various techniques for invoking a glossary of terms typically related to whatever program the display 202 currently is tuned to, although the glossary could apply to other shows as may be indicated by the user through a voice command or menu command or by inputting a channel number using the RC 200.

As shown, responsive to invoking the glossary, an alphabetized list of terms 224 is presented as a glossary. Using, e.g., the keys 214/216 a user can navigate through the glossary 224 to select, using the select key 219, 226 a term for further information. For remotes without a dedicated glossary button the glossary may be invoked by double clicking or long pressing a button such as the mute, info or display button or the like.

In the example shown, the user has selected "Captain Kirk". In response, the display 202 presents an information UI 300 shown in FIG. 3 that renders text and/or audio and/or graphic information related to the selected term.

Figure 3:
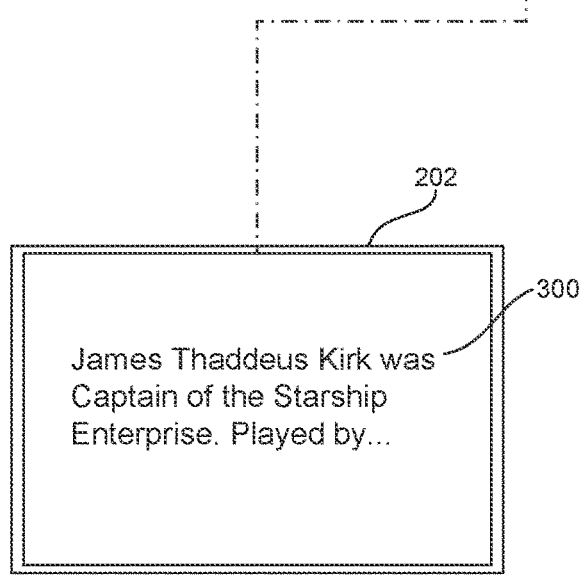
FIG. 3 illustrates the display shown in FIG. 2 after selection of a glossary term.
Figure 3A:
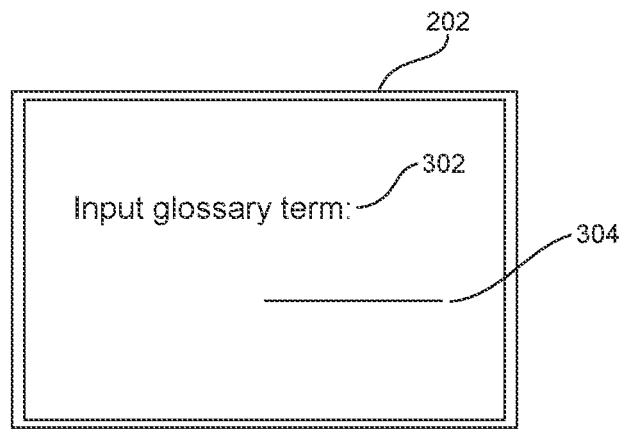
FIG. 3A illustrates the display shown in FIG. 2 of a glossary search field with the option for voice input icon.

FIG. 3A illustrates another technique in which a prompt 302 may be presented on the display 202 to enter a search term from the glossary into a field 304. In FIG. 3, not only can terms be input but also phrases "What is the North Wall?". Thus, the user may select a glossary term from the list in FIG. 2 or by entering a glossary word in FIG. 3A. To enter a term verbally a microphone indicator 306 may be selected to activate a microphone and voice recognition software.

Figure 4:
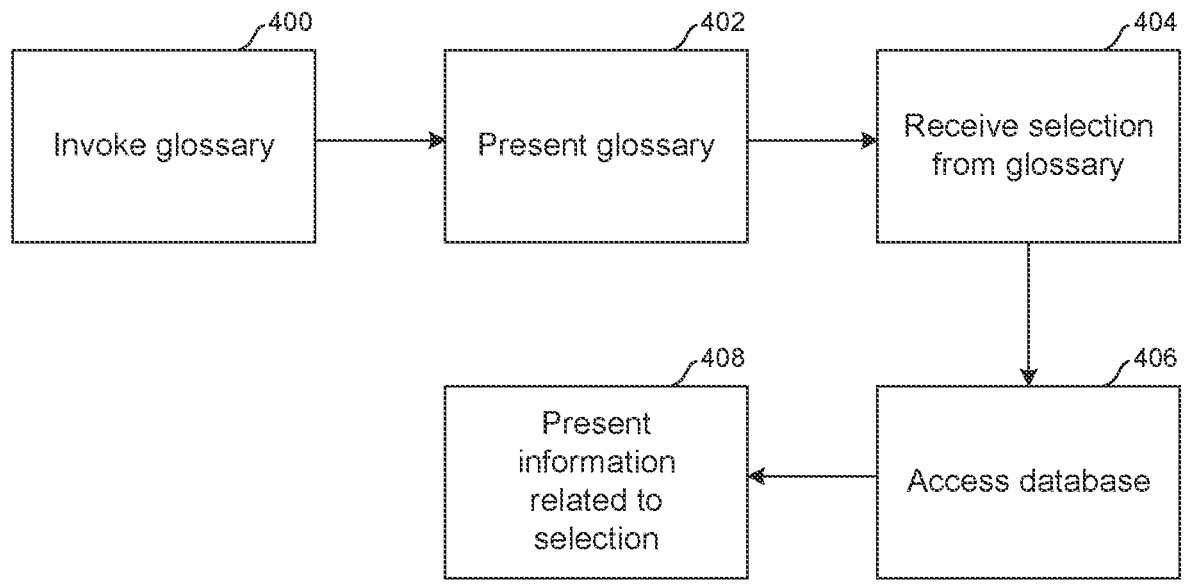
FIG. 4 illustrates example operating logic in example flow chart format that may be executed by any one or more of the processors described herein.

FIG. 4 shows overall logic consistent with present principles. Commencing at block 400 the glossary is invoked. Moving to block 402 the glossary is presented as shown in FIG. 2. Proceeding to block 404 a selection is received of an entry in the glossary. In response, the logic moves to block 406 to access a database of glossary information, using the selected term as entering argument to the database. The database may be hosted, for example, on the RC 200, display 202, or server 80 shown in FIG. 1 or combination thereof. A processor associated with the database accesses information regarding the selected glossary term. The database may store the glossary for each AV program such that for any program, when a glossary is invoked and searched as described, the server can know if the term along with program information conveyed with the term matches a program glossary term in the database. This information may be accessed from an online encyclopedia or website hosted by a broadcaster or other provider of the program or movie being watched or other source. Thus, the database may include a web-based network of information sources.

It should be understood that the player application that is rendering the content or highlighting a content choice has access to the appropriate database Uniform Resource Locator (URL) and identification for the content. Consequently, when the glossary is invoked, the player application is able to access directly to the database that is most appropriate for the content. The player application may need to identify and authenticate itself to the server in order to verify that the database search request is coming from a device whose user is a customer in good standing with the content delivery service.

The information expanding on the selected glossary term is returned and presented to the user visibly as shown in FIG. 3, and/or audibly.

Figure 5:
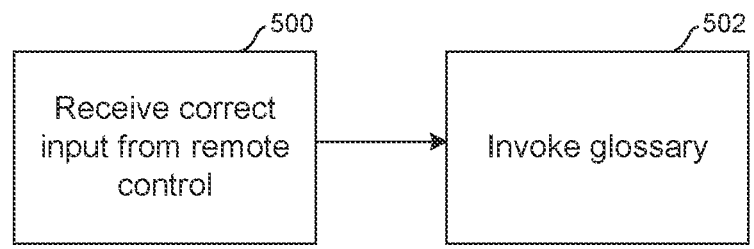
FIG. 5 illustrates example logic in example flow chart format illustrating a first example technique for invoking the glossary.

FIG. 5 illustrates a first technique for invoking the glossary at block 400 in FIG. 4. Commencing at block 500, a correct input is received from the RC 200 that corresponds to a command to invoke the glossary related to the currently tuned-to program or movie, for example. The command may be generated by a short press, multiple-press, or a long press on a general-purpose key of the RC 200, or it may be generated by operation of a special key such as the glossary key 214 shown in FIG. 2. In response, the glossary is invoked at block 502.

Figure 6:
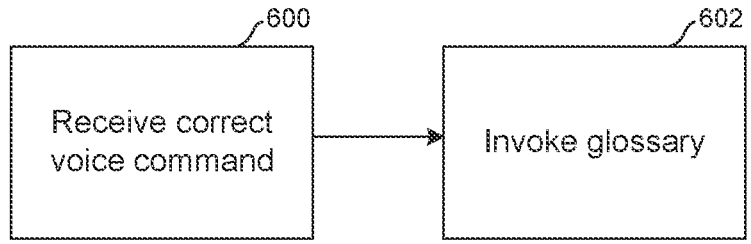
FIG. 6 illustrates example logic in example flow chart format illustrating a second example technique for invoking the glossary.

FIG. 6 illustrates a second technique for invoking the glossary at block 400 in FIG. 4. Commencing at block 600, a correct voice command is received from, e.g., the microphone 208 of the RC 200 shown in FIG. 2. The microphone 208 may also be located in AVD 12 in case of a device such as a tablet, notebook, or cell phone. The command may be the spoken word "glossary" as but one example. A user-defined command may be implemented if desired. In response, the glossary is invoked at block 602 by, e.g., the RC 200 signaling to the display 202 to present the glossary.

Figure 7A:
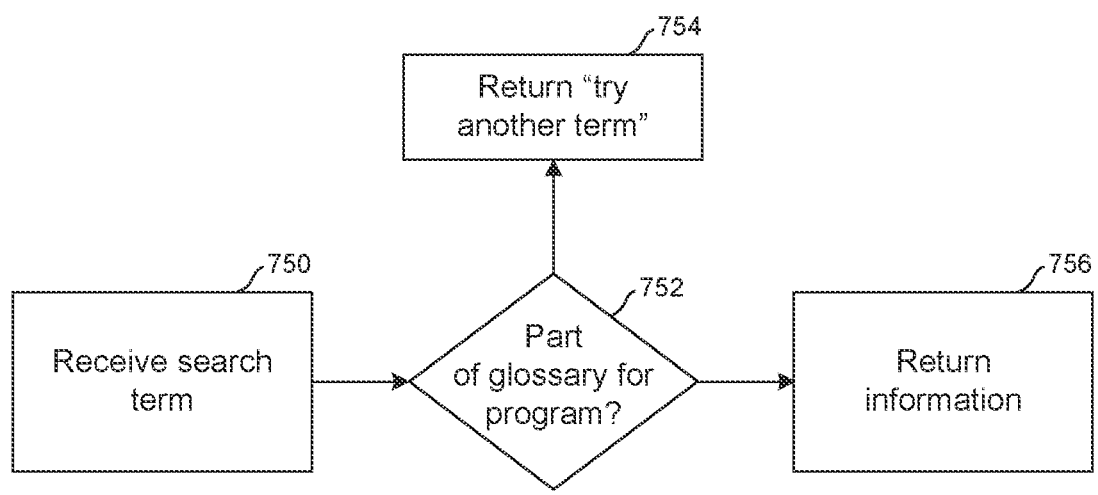
FIG. 7A illustrates example logic in example flow chart format illustrating an example technique for searching the glossary using a search query consisting of a term or phrase.
Figure 7:
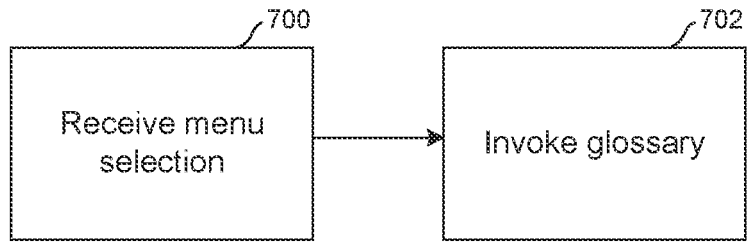
FIG. 7 illustrates example logic in example flow chart format illustrating a third example technique for invoking the glossary.

FIG. 7 illustrates a third technique for invoking the glossary at block 400 in FIG. 4. Commencing at block 700, a menu selection is received from, e.g., the UI 220 shown in FIG. 2 by means of manipulation of the RC 200. In response, the glossary is invoked at block 702.

The glossary for a series or movie or other program or show may be generated by a producer or provider of the content. This may be done by hand by experts. Machine learning (ML) can be used to interpret natural language queries. Word recognition in combination with the subject matter of the content can help narrow interpretation.

FIG. 7A illustrates logic consistent with FIG. 3A, in which a search term is received at block 750 and compared to the glossary for the AV content program under which the glossary is being invoked at decision diamond 752. If the term is not part of the glossary for that program, the logic may move to block 754 to prompt the user to try another term, as the term entered was not part of the program's glossary. If the term is part of the program's glossary the logic can move to block 756 to return information related to the term.

Figure 8:
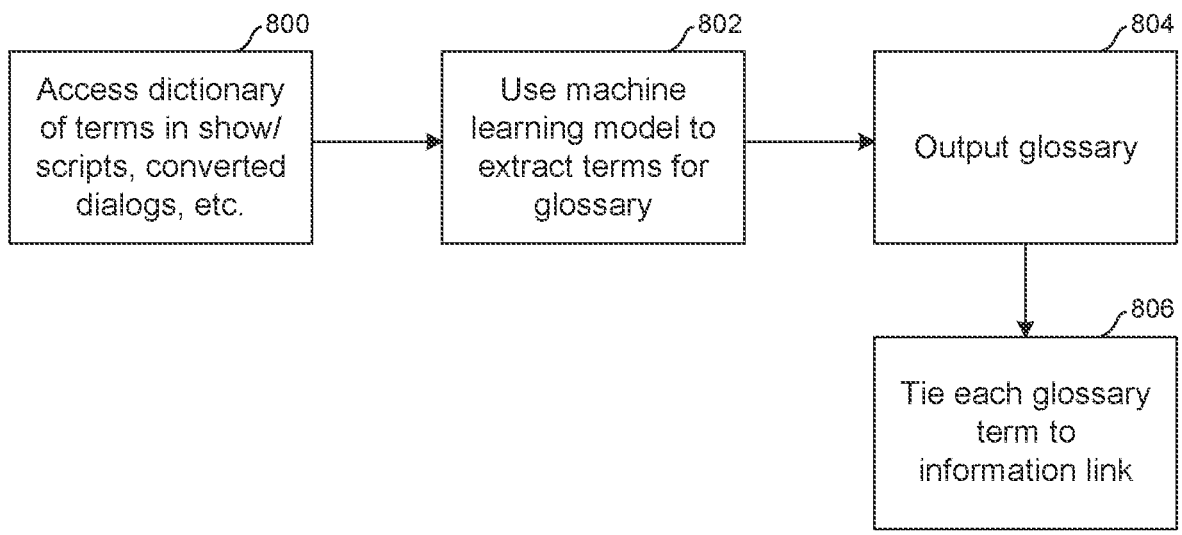
FIG. 8 illustrates example logic in example flow chart format for using a machine learning (ML) model to generate a glossary.

However, FIGS. 8 and 9 illustrate an example automated way to create glossaries consistent with present principles.

Commencing at block 800, a dictionary of all terms used in a movie or series or whatever content is desired to generate a glossary for is accessed. This may be computerized by inputting to a computer the audible playback from the content, which can be converted to text, and/or a text script. Other sources of terms may be accessed as well.

Moving to block 802, a machine learning (ML) model is used to filter the terms from block 802 to extract only a subset of those terms as glossary terms. This is to avoid over-inclusion in the glossary. The glossary is output at block 804 from the ML model and tied at block 806 to the database, e.g., by tying the terms to respective links to information sources on the respective terms.

FIG. 9 illustrates an example technique for training the ML model. Commencing at block 900, a training set of terms is input to the ML model along with ground truth indications as to whether the terms are worthwhile as glossary entries or not. Typically for example proper nouns are good candidates for inclusion in glossary along with concocted words not found in standard dictionaries (such as, e.g., "tricorder" or "warp drive") while prepositions, conjunctions, profanity, and nouns and verbs such as "street" and "are" that are common across most content are not.

It will be appreciated that whilst present principals have been described with reference to some example embodiments, these are not intended to be limiting, and that various alternative arrangements may be used to implement the subject matter claimed herein.

What is claimed is:

1. A method, comprising:
presenting on a display audio video (AV) content;
presenting on the display a list of terms pertaining to the AV content;
receiving selection from the list of terms;
responsive to the selection, presenting on the display information pertaining to the selection; and
generating the list of terms at least in part using a machine learning (ML) model trained by indicating proper nouns and concocted words as candidates for inclusion in the list and not indicating, as candidates for inclusion in the list, terms that are common across both the AV content and other content.

2. The method of claim 1, comprising:
presenting the list of terms responsive to voice command.

3. The method of claim 1, comprising:
presenting the list of terms responsive to manipulation of a remote control (RC) key.

4. The method of claim 1, comprising:
presenting the list of terms responsive to selection from a menu presented on the display.

5. An apparatus comprising:
at least one display;
at least one processor configured to control the display and programmed with instructions to:
present on the display first audio video (AV) content;
receive a first signal to invoke a glossary during play of the first AV content;
send the first signal and an identification of the first AV content to a glossary source;
receive a first glossary from the glossary source;
present on the display the first glossary along with the first AV content, the first glossary not pertaining to the first AV content and pertaining to second AV content different from the first AV content, the first glossary being established by a first list of terms; and
responsive to selection from the first glossary, present information on the display pertaining to the selection.

6. The apparatus of claim 5, wherein the AV content is on a currently tuned-to channel.

7. The apparatus of claim 5, wherein the processor is programmed to present the glossary responsive to at least one voice command.

8. The apparatus of claim 5, wherein the processor is programmed to present the glossary responsive to a selection from a menu presented on the display.

9. The apparatus of claim 5, wherein the processor is programmed to present the glossary responsive to a signal from a remote control (RC).

* * * * *